Oct. 20, 1925.
J. A. PROCTOR
1,557,725
VARIABLE ELECTRICAL CONDENSER
Original Filed Feb. 1, 1921
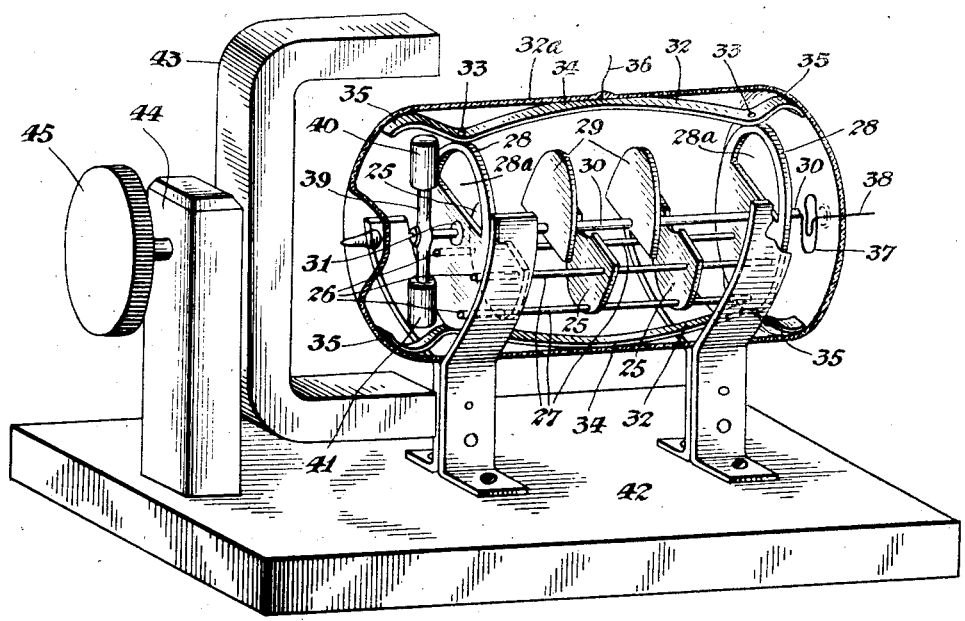
INVENTOR
John A. Proctor
BY
ATTORNEY Patented Oct. 20, 1925.

1,557,725

UNITED STATES PATENT OFFICE.

JOHN A. PROCTOR, OF LEXINGTON, MASSACHUSETTS, ASSIGNOR TO WIRELESS SPECIALTY APPARATUS COMPANY, OF BOSTON, MASSACHUSETTS, A CORPORATION OF NEW YORK.

VARIABLE ELECTRICAL CONDENSER.

Original application filed February 1, 1921, Serial No. 441,628. Divided and this application filed July 9, 1924. Serial No. 724,924.

*To all whom it may concern:*

Be it known that I, JOHN A. PROCTOR, a citizen of the United States of America, and a resident of Lexington, State of Massachusetts, have invented certain new and useful Variable Electrical Condensers, the principles of which are set forth in the following specification and accompanying drawing, which disclose the form of the invention which I now consider to be the best of the various forms in which the principles of the invention may be embodied.

This application is a division of my application Serial No. 441,628, filed February 1, 1921.

This invention relates to variable electrical condensers for general use, especially for high potential uses, such as in radio transmitters, power factor lines and wherever high potential condensers are found necessary. The invention claimed in this divisional application relates more particularly to a variable condenser of the enclosed casing type, preferably having a vacuum dielectric and provided with means for varying the condenser capacity by relative movement of the condenser conductors or armatures of opposite polarity. This variable condenser can be constructed so as to be suitable for use at any desired voltage.

In condensers of the sheet or jar type now in use, the electrical losses where high voltages are used are comparatively great resulting in loss of efficiency; and also in heating and ultimate disintegration of the condenser, especially if not properly made. This heating is partly due to losses in the dielectric apparently arising from dielectric hysteresis or frictionally-impeded movements of the atoms of the dielectric due to electric flux through the latter, and partly because of brush or corona discharges in the medium surrounding such condensers.

An object of the present invention is to provide a construction in which preferably the losses are at a minimum. In particular, the invention comprises a variable condenser in which the principal dielectric preferably is a vacuum. Briefly described, the variable condenser of this invention in its preferred form comprises a suitable casing, bulb or tube in which is mounted a condenser made up of spaced metallic plates, the air being exhausted from the casing to form between the plates a vacuum dielectric in which there is no appreciable loss in use due to gas ionization or to dielectric hysteresis; and means operable from the exterior of the casing to cause relative movement of the interior condenser conductors and corresponding variation of the condenser capacity.

The drawing is a perspective view of the embodiment of the invention in a variable condenser.

This variable condenser comprises spaced fixed metal plates 25 mounted upon and electrically connected to metal rods 26. Fixed plates 25 are spaced from each other by any suitable means such as the metal sleeves 27. The rods 26 are in turn secured to metal end plates 28. Movable metal plates 29 are fixed at spaced distances apart, and in such position as to alternate with the spaced plates 25, to a metal shaft 30 journaled in insulators 31 fixed in the end plates 28 to insulate the two sets of plates from each other. The upper portions of end plates 28 are cut away, forming spaces 28ª, and the movable plates 29 are sufficiently spaced therefrom so that plates 29 in the position shown will have very little capacity effect therewith, allowing a wider range of capacity variation. Two springs 32 comprising metal strips are connected at points 33 to end plates 28 and engage the side walls of the enclosing air-tight glass bulb or casing 32ª at points 34 to support the condenser yieldingly against longitudinal movement which might injure casing 32ª. This casing may be a bulb or tube as shown, preferably of glass or other non-magnetic material for a purpose to be described additional to the property of glass in readily permitting the sealing in of metal terminal leads.

The relatively movable condenser plates or conductors of the drawing preferably are constructed of materials such as nickel, etc., (as enumerated below) for the reasons below stated and treated as described below, inserted within the casing or bulb 32ª, sealed up and the air exhausted in the same manner as above described.

The features herein particularly pointed out as novel are described more particularly in this paragraph, and the next following two paragraphs. One terminal (that for the fixed plates 25) is a conductor 36 extending through and sealed in casing 32ª and connected to one of the two metal springs 32 connected to the metal plates 28, which, in turn, are electrically connected to fixed plates 25. The other terminal of the condenser (that for the movable plates 29) is a conductor 38 extending through and sealed in casing 32ª and connected to a spiral conducting coil 37 connected to one end of the metal shaft 30, but of flexible wire arranged with the slack of the coil as shown to allow the free rotation of shaft 30 carrying the movable conductors. The parts of terminals 36 and 38 which extend thru casing 32ª, and are fixedly sealed therein, preferably are of platinum when the casing is of glass. Thus these terminal leads are independent of the capacity-varying means now to be described.

The left end of the shaft 30 terminates in a magnet 39 of suitable magnetic material such as iron, steel or nickel, supported in spaced relation to the end of the tube 32ª. This magnet has the poles 40 and 41. The encased condenser is supported in any suitable manner on a base 42. A horseshoe magnet 43, located outside casing 32ª, journaled in the support 42 at 44 and provided with an actuating knob 45, embraces the end of the non-magnetic casing 32ª (as glass, as described) adjacent to exterior magnet 39. As magnet 43 is rotated, this rotation will be communicated to the variable condenser magnetically through the co-acting interior magnet 39, thus providing means for varying the capacity of the condenser without danger of impairing the high degree of vacuum necessary to this invention, or in any instance, without the necessity of extending a mechanically moving part thru casing 32ª. Either of the magnets 39, 43 may be a soft iron or nickel armature, if so desired. And the invention includes means alternative with magnet 43 and co-acting magnet 39 for causing, outside the enclosing casing, a magnetic field which extends thru and inside the casing to cause the relative movement of the condenser conductors. The invention also includes means operable outside the casing but acting or effective inside the casing without affecting the vacuum seal thereof, to cause a relative movement of the interior condenser conductors.

Inasmuch as the movable plates 29 are unbalanced on their shaft 30 and tend (when their axis 30 is horizontal as shown) to hang down under the influence of gravity in a position 180° from that shown (for clearness) in the drawing, therefore this condenser possesses the ability to have its capacity varied by rotating the casing 32ª (and consequently the fixed plates 25) around the longitudinal axis of the casing, the movable plates hanging down by gravity, remaining stationary. Thus the capacity of the condenser can be varied, with or without the operation of a magnetic field, by a rotation of the entire casing 32ª in its supports shown as secured to base 42; and, owing to the disclosed construction each of the relatively movable conductors can be moved with respect to the other.

The order of vacuum or exhaustion which exists in a condenser containing a dielectric such as above described preferably is extremely high, such that no appreciable gas ionization takes place to cause losses while the condenser is in operation, which condition is obtained, for example, by a pressure of the order of a millionth of a millimeter. Such exhaustion may be obtained by any well-known means such as a Gaede or molecular pump, or Langmuir's condensation pump.

All materials inside the casing, when a vacuum dielectric is employed, are to be suitably treated to remove gases (occluded or otherwise) according to any of the well-known processes in use for the production of high vacuum apparatus. Such treatment may consist, for example, in initially (before assembling in the casing) treating these materials to remove gases preliminarily, as by heat or other treatments. In addition, it is advisable, after assembling in the casing, to subject the contained materials to further treatment to remove any residual gases. This final treatment may consist of a bombardment of the materials from a heated filament which is located within the casing temporarily or otherwise. I prefer to use as a first treatment the well-known method of removing gases from metals consisting of the use of the Northrup high-frequency electrical furnace. In such case, my entire condenser, while undergoing its exhaustion, is placed within the field of a coil carrying high frequency current. This heats the metal parts inside the condenser-casing, thereby driving off and removing gases before the casing is completely exhausted and sealed off. The materials used in these vacuum condensers should be of such a nature that the gases may be easily removed by the above-described processes. Therefore, in constructing the condensers, nickel, tungsten, molybdenum or rolled steel should be used wherever possible in constructing all parts.

By the above construction and invention, a condenser in which the plates 1 and 2 are separated a centimeter can be constructed to stand a million volts. In such a condenser and with the vacuum dielectric of the order specified, the loss is practically zero, being limited to the minute Joulean losses in the metal plates and leads, and the minute losses in the dielectric surrounding the terminals, and the minute losses in the supporting dielectric material.

While the condenser hereof preferably has a vacuum dielectric in general as above described as to preference in detail, the important aspect of the invention hereinafter claimed is the construction and arrangement involving the variation of the condenser capacity by relative movement of the conducting plates inside the casing and separated from one another by any suitable dielectric; and particularly, when the dielectric is a vacuum, or when the relatively movable conductors are wholly supported and enclosed within the casing, a means for causing such relative movements which does not affect the vacuum seal or enclosure of the casing.

It is to be understood that the invention is not limited to the embodiments and features specifically shown and described herein, but that such embodiments and features are subject to changes and modifications without any departure from the spirit of the invention.

I particularly point out and distinctly claim the part, improvement, or combination which I claim as my invention or discovery, as follows:—

1. A variable electrical condenser comprising electrical conductors which are movable relative to one another to permit variation of the condenser capacity; a vacuum casing surrounding said conductors and a vacuum dielectric between them, said casing mechanically supporting both said conductors in positions spaced from one another by the vacuum dielectric; and means causing variation of the condenser capacity by relative movement of said conductors in their vacuum-spaced relation to one another.

2. A variable electrical condenser comprising electrical conductors which are movable relative to one another to permit variation of the condenser capacity; a vacuum casing surrounding said conductors and a vacuum dielectric between them; means causing variation of the condenser capacity by movement of said conductors in their vacuum-spaced relation to one another; and condenser terminal leads which are independent of said varying means, electrically connected to the respective vacuum-spaced conductors, and which extend thru said vacuum casing to the exterior thereof and are fixedly sealed in the wall thereof.

3. A variable electrical condenser comprising electrical conductors separated from one another by a dielectric and movable relative to one another to permit variation of the condenser capacity; a casing surrounding said conductors and constituted of material which permits extension of a magnetic field thru it; means also located inside said casing and influenced by a magnetic field to cause relative movement of said conductors; and means located outside said casing and establishing a magnetic field extending thru said casing and influencing said interior moving means to cause relative movement of said conductors and thereby vary the capacity of the condenser.

4. An electrical condenser comprising relatively movable conducting plates arranged in spaced relation to each other and constituting positive and negative conducting plates of the condenser, a vacuum casing in which said relatively movable plates are yieldingly supported and from which the air has been exhausted forming a vacuum dielectric between said plates, terminals connected to said relatively movable plates and passing through said casing, a magnetic member within the casing and fixed to said movable plates, and a second magnetic member suitably supported outside of said casing and arranged in proximity to the portion of the casing in which the first-mentioned magnetic member is located, whereby the movement of the second magnetic member will impart a corresponding movement to the magnetic member and movable plates within the casing to vary the capacity of the condenser.

5. A variable electrical condenser comprising electrical conductors which are movable relative to one another to permit variation of the condenser capacity; a vacuum casing surrounding said conductors and a vacuum dielectric between them, said casing being constituted of material permitting extension thru it of a magnetic field; and means including a generator of a magnetic field and located outside the casing but establishing a magnetic field within the casing which causes relative movement of said conductors and a consequent variation of the condenser capacity.

6. A variable electrical condenser comprising electrical conductors which are relatively rotatable to permit variation of the condenser capacity; a vacuum casing of insulating material enclosing said condenser conductors and a vacuum dielectric between them in the casing; both said condenser conductors being supported by said vacuum casing and located entirely within it, one being mounted rotatably relative to the insulating casing and the other being fixed relative to said casing; and condenser terminal leads extending from said conductors out thru the wall of the insulating vacuum casing and sealed in said wall.

7. A variable electrical vacuum condenser comprising relatively movable conductors permitting variation of the condenser capacity; a vacuum casing enclosing said conductors and a vacuum dielectric between them; terminal leads extending thru and fixedly sealed in said casing and electrically connected with said conductors to permit their relative movement; and means independent of said leads and located outside said casing for moving a magnetic field inside the casing thereby causing relative movement of said condenser conductors.

8. A variable electrical condenser comprising electrical conductors separated from one another by a dielectric and movable relative to one another to permit variation of the condenser capacity; a casing enclosing said conductors and dielectric and mechanically supporting both of said conductors; means causing variation of the condenser capacity by causing relative movement of said conductors; and terminal leads independent of said varying means, electrically connected to said respective conductors, and passing thru said enclosing casing to the exterior thereof.

9. A variable electrical condenser comprising a main support, two relatively movable conductors insulated from one another and separated by a dielectric; a horizontal shaft which is rotatably mounted on and relative to said main support; one of said conductors being mounted fixedly relative to said main support; and the other of said conductors being fixedly mounted on said shaft but in unbalanced relation thereto whereby it is held normally by gravity in a given position even if said support and the conductor fixed thereto be moved.

10. A variable electrical condenser comprising a vacuum casing and relatively movable condenser conductors wholly enclosed thereby and having a dielectric between them consisting of the vacuous space enclosed by the casing; one of said conductors wholly enclosed by the casing being supported therein in fixed relation thereto subject to participation in movement thereof; and the other conductor wholly enclosed by the casing being supported therein in movable relation thereto subject to being held by gravity in a fixed position relative to the first conductor if the casing with said first conductor be moved.

11. A variable electrical condenser comprising condenser conductors one of which is movable relative to the other; means tending to hold said movable conductors in a given position; a casing enclosing said conductors and said holding means; and means located outside said casing for moving a magnetic field inside the casing and thereby correspondingly moving said movable conductor in opposition to the effect of said holding means to vary the condenser capacity.

12. A variable electrical condenser comprising electrical conductors which are movable relative to one another to permit variation of the condenser capacity; a casing enclosing said conductors and a dielectric between them; means establishing a magnetic field acting inside the casing to control the relative movement of said conductors; and means located outside the casing for moving said field to cause such relative movement of said conductors.

13. A variable electrical condenser comprising condenser conductors which are movable relative to one another to permit variation of the condenser capacity; a vacuum casing of glass entirely enclosing said movable conductors and a vacuum dielectric between them; circuit leads extending from the exterior to the interior of the casing and fixedly sealed in the glass wall thereof, said leads being the only material things extending thru the casing wall; means effective within the casing for controlling relative movement of said condenser-conductors therein; and a controlling device, located outside said vacuum casing, for causing operation of said moving means.

14. A variable electrical condenser comprising electrical conductors which are movable relative to one another to permit variation of the condenser capacity; a movable vacuum casing of glass entirely surrounding said conductors and a vacuum dielectric between them; circuit leads extending from the exterior to the interior of the movable casing, fixedly sealed in the glass wall thereof, and electrically connected to said relatively movable conductors respectively; one of said conductors wholly enclosed by the casing being supported therein in fixed relation thereto subject to participation in movement thereof; and the other conductor wholly enclosed by said casing being supported therein in movable relation thereto subject by gravity to remaining in fixed position relative to the first conductor, whereby each of said conductors is movable relative to the other.

15. A variable electrical condenser comprising condenser conductors which are movable relative to one another to permit variation of the condenser capacity; circuit leads connected to said respective conductors; a vacuum casing enclosing said conductors and thru the wall of which said leads extend and in which wall they are sealed, whereby said relatively movable condenser conductors are wholly enclosed by the vacuum casing; means establishing a magnetic field acting inside the casing to control the relative movement of said condenser conductors; and means located outside said casing for moving said field to cause such relative movement of said conductors.

16. A variable electrical condenser comprising a vacuum casing and conductors relatively movable therein and having a dielectric between them consisting of the vacuous space enclosed by said casing; both said conductors being supported by said casing; and means operable outside said casing but acting inside the casing, without affecting the vacuum seal thereof, to cause relative movement of said interior conductors.

JOHN A. PROCTOR.